United States Patent
Siano et al.

(12) 
(10) Patent No.: US 6,454,980 B1
(45) Date of Patent: Sep. 24, 2002

(54) GRANULATED OR PELLETIZED COMPOSITIONS OF GRAFTING UNITS

(75) Inventors: Dante Siano, Cologno Monzese; Francesco Mascia, Guanzate, both of (IT)

(73) Assignee: Johnson Control S.p.A., Lomagna (IT)

( * ) Notice: Subject to any disclaimer, the term of this patent is extended or adjusted under 35 U.S.C. 154(b) by 0 days.

(21) Appl. No.: 09/558,029

(22) Filed: Apr. 25, 2000

Related U.S. Application Data

(63) Continuation of application No. 08/892,962, filed on Jul. 16, 1997, now abandoned, which is a continuation of application No. PCT/EP96/00136, filed on Jan. 15, 1996.

(30) Foreign Application Priority Data

Jan. 20, 1995 (IT) .......................................... MI95A0083

(51) Int. Cl.$^7$ .............................................. B29C 47/00
(52) U.S. Cl. .............. 264/141; 264/331.13; 264/331.15
(58) Field of Search .............................. 525/327.3, 113, 525/313; 428/500; 296/901, 146.5, 191; 264/141, 142, 143, 331.13, 331.15

(56) References Cited

U.S. PATENT DOCUMENTS

| | | | | |
|---|---|---|---|---|
| 3,456,038 A | * | 7/1969 | Newman et al. | |
| 3,806,558 A | * | 4/1974 | Fischer | |
| 3,935,136 A | * | 1/1976 | Childers et al. | |
| 4,267,080 A | * | 5/1981 | Yokoyama et al. | |
| 4,732,940 A | * | 3/1988 | Yamaoka et al. | |
| 4,785,045 A | * | 11/1988 | Yonekura et al. | |
| 4,948,820 A | * | 8/1990 | Addeo et al. | |
| 4,948,840 A | * | 8/1990 | Berta | |
| 5,480,942 A | * | 1/1996 | Addeo et al. | |
| 5,503,923 A | * | 4/1996 | Goto et al. | |
| 5,510,433 A | * | 4/1996 | Baker et al. | |
| 5,541,262 A | * | 7/1996 | Brichta et al. | |
| 5,574,111 A | * | 11/1996 | Brichta et al. | |
| 5,714,545 A | * | 2/1998 | Lee et al. | |

FOREIGN PATENT DOCUMENTS

| | | | |
|---|---|---|---|
| EP | 261 786 A1 | * | 3/1988 |
| EP | 542 253 A2 | * | 5/1993 |
| EP | 618 259 A2 | * | 5/1994 |

* cited by examiner

*Primary Examiner*—Mark Eashoo
(74) *Attorney, Agent, or Firm*—Gibbons, Del Deo, Dolan, Griffinger & Vecchione

(57) ABSTRACT

A granulated or pelletized composition of propylene homo and copolymers onto which are grafted grafting units of vinylpolybutadiene and further grafting units selected from polyalkenylenes, EPM and EPDM polymers, and mixtures thereof. The composition has a Shore D hardness value equal to or less than 35 and a fogging value equal to or greater than 90%. The composition is suitable for injection molding. A method of producing the granulated or pelletized composition comprising forming the composition by mixing the propylene homo and copolymers, vinylpolybutadiene grafting units and further grafting units with peroxide radical initiators, extruding the composition under heat and granulating the extruded polymer composite. An interior car door panel or interior car trim element having an outer skin made of granulated or pelletized forms of the composition.

6 Claims, No Drawings

GRANULATED OR PELLETIZED COMPOSITIONS OF GRAFTING UNITS

This is a continuation of U.S. patent application Ser. No. 08/892,962, filed Jul. 6, 1997 now abandoned, which is a continuation of PCT/EP96/00136, filed Jan. 15, 1996.

FIELD OF THE INVENTION

The present invention relates to grafted propylene homo and co-polymers and to a process for their preparation. The grafting units are selected from 1,2 polydienes, polyalkenylenes and amorphous elastomers obtained through copolymerization of ethylene-propylene (EPM) or ethylene-propylene with a not conjugated diene monomer (EPDM) Particulary, the present invention concerns a resin suitable to be used as synthetic leather for articles such as, for instance, interior car door panels.

BACKGROUND OF THE INVENTION

The production of interior door panels, dashboard elements, interior trims, consoles and similar parts was usually carried out by coupling a layer of synthetic leather to a supporting element. The two main coupling methods are by glueing the synthetic leather to a rigid support or by pressing and shaping said synthetic leather in a mold together with a heated thermoplastic supporting element.

Recently, the applicant developed a process to produce panels or similar elements by means of co-injection of an outer skin (that represents the synthetic leather) and an inner support layer that gives to the final part the requested rigidity.

One of the problems to be solved using such technology resides in the physical properties of the skin material. The skin material has to join a pleasant-touch (softness) characteristic with a easy-flow behaviour (for injection molding). Polymers having either pleasant-touch or easy-flow behaviour are well known. Polymers with a good pleasant-touch are, e.g., thermoplastic elastomers (TPE) and the polyolefin thermoplastic elastomers (PTE) that are EPM or EPDM blends polyolefin based, whose properties are quite similar to a rubber, or the new TPO (thermoplastic polyolefin) materials which behave themselves as a thermoplastic elastomer.

Unfortunately, while these materials are provided with the pleasant touch characteristic, they are lacking the required easy-flow behaviour; thus, they can not be used in an injection molding process.

The easy flow behaviour is usually achieved via reactive degradation, i.e. a process that reduces the molecular weight (molecular chain length) of the polymer. It is known to carry out selective degradation of propylene homo and co-polymers by means of peroxide or non-peroxide radical initiators.

The use of peroxide radical initiators such as dicumyl peroxide (DCUP), di(tert-butyl) peroxide or of non-peroxide radical initiators such as 2,3-dimethyl-2,3-diphenylethane or 3,4-dimethyl-3,4-diphenylhexane in a concentration between 0.1 to 1.0 by weight, results in an improvement of the Theological properties.(easy-flow) of the propylene polymers. The drawbacks of this method are that the mechanical properties (modulus and impact strength) of the polymers are lowered and that molecules having low weight molecular chains are by-produced. These products have a low melting point and, at low temperature, they become viscous liquids that migrate towards the surface of the molded piece, making it sticky and not suitable to be used.

It is known to modify (grafting) crystalline propylene polymers by treating them at temperatures within the range of 150° to 300° C. with alpha-olefin polymers and co-polymers, for example 1-butene, in the presence of a peroxide radical initiators (European patent 261.786) or of non-peroxide radical initiators (European patent 542.253). In both cases it is not achieved the reorganization of the low weight polymeric chains, hence there is not any reduction of the final piece tackiness even at quite low temperature (<60° C.). Polyalkenylenes grafted on propylene are known as well (Plastic, Rubber and Composite Processing and Application 18, Pg 47–58, 1992 and European Patent EP 642.622). In this case the obtained resins show, in spite of a tackiness reduction, a substantial melt fluidity reduction such as to preclude their processability in injection and co-injection molding.

OBJECT OF THE INVENTION

The aim of the present invention is to solve the above mentioned problems by providing propylene polymers endowed with the properties requested, and a process for their preparation.

SUMMARY OF THE INVENTION

Said object is obtained by means of the present invention that relates to homopolymers and copolymers of propylene. The invention also relates to a process for preparing said (co) polymers, The invention further relates to the use of the above mentioned polymers for producing interior car door panels or other interior elements,. According to a preferred embodiment, the propylene (co)polymers comprise, as grafting units, 5 to 65% of grafted amorphous elastomer obtained through copolymerization of ethylene-cropylene EPM or ethylene-propylene diene monomer (EPDM). EPM and EPDM polymers are known in the relevant art as EPRs, i.e., ethylene/propylene copolymer rubbers, and are practically amorphous. The range of crystallinity for amorphous EPM and EPDM polymers is understood to be from 0 to approximately 10%. Both EPM and EPDM Polymers can be exended with naphtene/paraffin oil.

According to another embodiment, the propylene (co) polymers comprise also from 0.1 to 5% by weight of vinyl polybutadiene as grafting units.

According to a further embodiment of the invention, the (co)polymers are obtained by thermal degradation with the presence of peroxide initiators.

The (co)polymers according to the present invention solve the technical problem above mentioned : thanks to their fluidity they are suitable for injection or co-injection molding process, and the final item thus obtained shows no tackiness. The invention (co)polymers, are also suitable for production of synthetic leather or other items having a good softness, i.e. the pleasant-touch characteristic, with no tackiness. A synthetic leather so obtained could be used to produce car trim panels according to the glueing or hot pressing methods above referred to.

DESCRIPTION OF THE PREFERRED EMBODIMENT

As above mentioned, propylene homo and -copolymers are grafted by using grafting units selected from polyalkenylenes, EPM and EPDM polymers, or mixtures thereof, the amount of polyalkenylenes being within the range from 1 to 30t by weight and the amount of EPM and/or EPDM polymers being within the range, from 5 to 65% by weight of the total composition.

In a preferred embodiment, also vinylbutadienes, i.e. alpha olefins polymers, are added as grafting units to those mentioned above, the amount of vinylpolybutadiene being within the range from 0.01 to 10% by weight.

The preferred starting polymers are propylene polymers, however other starting polymers can:be used. The polymer object of the invention can be prepared by means of reactive transformation (degradation) for example in a extruder or directly during the injection or co-injection molding.

The material fluidity can be kept steady, increased or reduced and in the meantime its softness will be improved making it, in terms of superficial hardness, similar to thermoplastic elastomers.

The process of the invention consists in mixing at a temperature range within 160° to 310° C. propylene polymers with polyalkenylenes and/or amorphous ethylene-propylene copolymers and/or ethylene-propylene-diene terpolymers and optionally, but not necessarily, with alpha-olefins polymers in the presence of radical initators.

Both homopolymers and copolymers of propylene are referred to with the term propylene polymer. In particular the suitable propylene polymers are (co)polymers having an isotactic index higher than 0.1%, copolymers comprising one or more alpha-olefins having 2–10 carbon atoms, for example ethylene, 1-butene, 1-pentene, 4-methyl-1-pentene, 1-hexene, 1-octene; polypropylene compositions obtained through sequential polymerization of propylene and its mixture with ethylene and/or alpha-olefins; blends of propylene (co)polymers with EP(D)M (in this latter case the EP(D)M polymers do not act as grafting units).

The propylene (co)polymers have a Melt-Flow-Index (MFI) comprised in the range from 0.1 to 1000 g/10 min, preferably between 0.2 and 60 at 230° C./21.6N (according to ASTM 1238). The amount of propylene polymers is usually at least 10% by weight.

The vinyl polybutadienes, i.e. liquid polymers of butadiene, are usually prepared by anionic polymerisation of butadiene using organolithium catalysts in a solvent, e.g. toluene, that is removed at the end of the reaction. Butadiene monomer, the fundamental building unit, has the chemical formula:

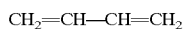

The anionic polymerisation of butadiene leads to polymer chains containing structure of three fundamental different types:

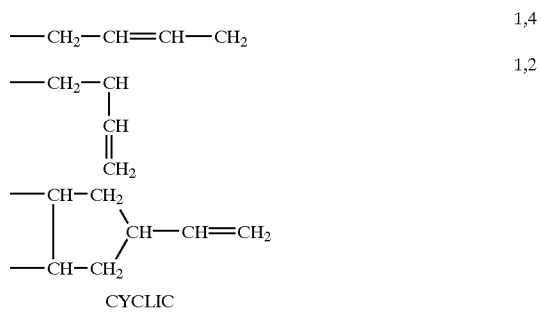

Preferably the polybutadiene, herein referred to as vinyl polybutadiene, used has a content of at least 20% of 1,2 structure and the molecular weight (Mn) is within the range from 900 to 10,000.

The quantity of vinylbutadiene used in the process of the invention is preferably not greater than 10% by weight, preferably comprised between 0.1 and 5 by weight of the total amount of resin.

The preferred polyalkenylene used is a polyoctenylene, which is produced from cyclo-octene by the so called metathesis polymerisation. It consists of linear as well as cyclic macromolecules which are unbranched and contain one double bond per 8 carbon atoms. The double bonds may be arranged in TRANS or in CIS configuration. The grade of crystallinity depends on the contents of TRANS configuration.

Examples of these polymers are the Vestenamer 8012 and 6213 (™) commercialised by Hüls AG. The quantity of polyalkenylene used in the process of the invention can vary within a large range; generally the quantity is less than 30V by weight and preferably comprised between 1 and 20% by weight of the total composition. The EPM and EPDM polymers are obtained through copolymerization of ethylene-propylene to give the following base units

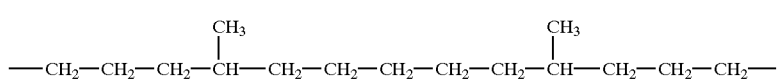

EPM Copolymer Macromolecule or Ethylene-propylene and a Non Conjugated Diene Monomer, to give

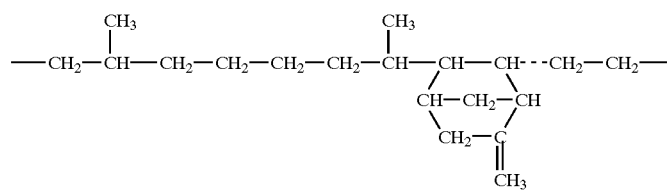

EPDM Terpolymer Macromolecule

Examples of this kind of materials are the Dutral CO and Dutral TER (™) produced and commercialised by Enichem Elastomeri EPM and EPDIM polymers, are used as such, i.e. in a "dry" form, or extended with oils, i.e. after being added with paraffin/naphtene oils to increase their softness. The amount of oil added can reach 90–100% by weight of the EP(D)M polymer. The quantity of EPM or EPDM in the "dry" form is within the range of 5 to 65% by weight, preferably within 5 to 45% and most preferably within 8 to 30% by weight of the total composition. Addition of oil to the EP(D)M polymers results in increased softness and lower costs of the final polymer composition. The radical initiator can be selected among oxide ones as for example, dicumyl-peroxide (commmercialised as Perkadox BC-FF (™) by Akzo Nobel, or DCUP (™) by Peroxid Chemie GmbH), 2,5-bis (tert-butylperoxy)-2,5-dimethyl hexane (commercialised as Trigonox 101 (™) by Akzo-Nobel or DHBP (™) by Peroxid-Chemie). Among the non-peroxide ones, suitable initiators are those such as 2,3-dimethyl-3,4-diphenyl hexane (commercialised as Perkadox (™) by Akzo Nobel or CCDFH (™) by Peroxid-Chemie), 2,3-dimethyl-2,3-diphenyl butane (commercialised as Perkadox 30 (™) by Akzo Nobel or CCDFB by Peroxyd Chemie).

The contents of radical initiators according to the invention can vary within a wide range according to the required effect, namely within 0.05 to 3.51 by weight preferably from 0.1 to 2.5% by weight of the total composition.

In order to prevent oxidative thermodegradation phenomena during the reactive process, antioxidants and stabilisers are used. Among the primary antioxidants can be mentioned sterically hindered phenols such as 2,6-di-tert-butyl-4-methylphenol (BHT) and secondary amines. Suitable secondary antioxidants are thioethers, phosphites and phosphonites. The antioxidants contents usually is not higher than 1.5% preferably between 0.1 and 1.0% by weight. The invention will be now further described with reference to the following examples with the aim of illustrating and not limiting the invention.

In the following examples it is used, as reference value for tackiness, the "fogging value" (it means the absence of polymer short chains able to migrate towards surface). The fogging value is expressed as the percent of light transmitted through a glass sheet perfectly transparent, taken as reference, on which the substances that, upon heating, migrate to the surface of the specimen and then to the glass sheet are deposited. The lower is the transmission value the higher is the superficial migration.

EXAMPLES

Example 1

500 parts by weight of polypropylene copolymer with a Melt Flow Index (MFI) of 0.6 dg/min (measured according to ASTM or 1238/L), Hardness Shore D of 323 (measured according to ASTM D 2240) and a fogging value of 95% (according to DIN 75201) commercialised by Montell (commercial name (™) Hifax CA10A) were subjected to mixing with 0.75 parts by weight of antioxidant (Irganox 1035 (™) produced and commercialised by Ciba-Geigy) and with 1.15 parts of peroxide radical initiator 2,S-Bis(tert-butylperoxy)-2,5-dimethylhexane supported on silica (commercial name (™) Trigonox 101–50d-pd by Akzo Nobel).

The mixture was fed into the hopper of a twin screws extruder MD30 by Bausano with a thread of 30 mm and a L/D ratio of 19.

The mixture was then extruded operating at a temperature in the screws cylinder between 200 and 220° C. with a flow rate of 20 Kg/h, screws speed of 25 rpm and a stay time *between 60 and 180 sec. The polymer is extruded in a string shape that afterwards is granulated.

The pellet, so produced, characterized according to ASTM 1238/L (Melt Flow Index) gave a value of 16 dg/min, Hardenss Shore D=35 and a fogging value <75% (DIN 75201). The characterization showed a dramatic decrease of the fogging value, accompanied by an excessive tackiness of the specimen surface.

Both phenomena are due to the polymer chain degradation (molecular weight reduction) because of the use of the radical initiator.

Example 2

Further 1.15 parts by weight of Trigonox 101/50 (™) are added to the mixture described in example 1. The extrusion and the granulation are perfomed following the example 1. The melt flow index value according to ASTM 1238L is 100 dg/min, hardness Shore D (ASTM D2240) is 38 and the fogging values <70%.

Example 3

5 parts by weight of a liquid vinyl polybutadiene, having an average molecular weight of 2600 and a viscosity at 25° C. of 85 Poise (produced and commercialised by Revertex Ldt. as Lithene PH (™)) were added to the mixture mentioned in the reference example 2.

The pellets production was perfomed according to example 1. The melt flow index became 20 dg/min, the hardness Shore D=35 and the fogging values less than 85%.

Example 4

15 parts by weight of a polyalkenylene (produced and commercialised by Hüls AUG as Vestenamer 8012 (™)) are added to the mixture of example 3. The extrusion and the pellets production were perfomed according to example 1.

The characterization values are as follow:

MFI=13 dg/min;

hardness Shore D=25;

fogging >93%.

Example 5

25 parts by weight of Vestenamer 8012 (™) were added to the mixture of example 2. The pellets production was performed according to example 1.

The characterization values were as follows:

MFI=16 dg/min;

hardness Shore D=25;

fogging >9%.

Example 6

225 parts by weight of a polypropylene copolymer with a melt flow rate 230° C./2.16N of 45 g/10min (according to ISO 1133), flexural modulus of 1350 MPa (according to DIN 53457) and fogging value >95% produced and commercialised by PCD polymers as USC 1012A were subjected to mixing with 270 parts by weight of an amorphous ethylene-propylene copolymer (EPM) with an extended oil content of 50% by weight with a Mooney viscosity ML(1+4) at 125° C. of 31, produced and commercialised by Enichem Elastomeri as Dutral CO 554 (™), and with 0.75 parts by weight of a phenolic antioxidant (Irganox 1035,™, produced and. -commercialised by Ciba-Geigy) and 0.75 parts by weight of a peroxide radical initiator, DHBP-45 ICIG 2,5-Dimethyl-2,5 di(terbutyl peroxy) hexane (45% by weight with chalk) produced and commercialised by Peroxid Chemie GmbH. The mixture was then extruded operating at a temperature in the screws cylinder between 170° C. and 210° C., with a flow rate of 40 Kg/h, screw speed of 20 rpm and a stay time between 60 and 180 sec.

The polymer is extruded in-a string shape and granulated. The pellets, so produced, characterized according to ASTKS 1238/L (melt flow index) gave a value of 34 dg/min and fogging value >95% (DIN 75201).

Example 7

167.5 parts by weight of a polypropylene copolymer USC 1012A were subjected to mixing with 332:5 parts by weight of Dutral CO 554, with 0.75 parts by weight of Irganox and 1.75 parts by weight of DHBP-45 IC/G.

The pellet production was performed according to example 6. The characterization values are as follows:

MFI=31 dg/min;

hardness Shore D=68;

fogging >95%.

Example 8

164.5 parts of a propylene copolymer USC 1012A were subjected to mixing with 325.5 parts by weight of Dutral CO554, 10 parts by weight of vinyl polybutadiene (Lithene PH (™) by Revertex Ltd.) and 1.75 parts by weight of DHBP-46 IC/G. The pellet production was performed according to example 6. The obtained characterization values are as follows MFI=18.5 dg/min hardness Shore A=68 fogging >90%.

What is claimed is:

1. A process of producing a granulated or pelletized polymer composition by selective degradation, the process comprising the steps of forming the composition by mixing units of propylene homo and copolymers, vinylpolybutadiene grafting units, further grafting units and peroxide radical initiators, said vinylpolybutadiene grafting units and said further grafting units being grafted onto said propylene homo and copolymers, the vinylpolybutadiene grafting units being in an amount within the range from 0.1 to 10% by weight of a total weight of the composition, said vinylpolybutadiene grafting units comprising at least 20% of 1,2 structures, the further grafting units selected from a group consisting of polyalkenylenes, amorphous EPM and EPDM polymers, and mixtures thereof, the amount of polyalkenylenes being within the range from 1 to 30% by weight and the amount of amorphous EPM and EPDM polymers being within the range from 5 to 65% by weight of the total weight of the composition; heating the mixed units and granulating the heated, mixed units to form the granulated or pelletized polymer composition, the propylene homo and copolymers being selected from a group consisting of homo and copolymers having an isotactic index higher than 0.1%, copolymers comprising one or more alpha-olefins having 2–10 carbon atoms, polypropylene compositions obtained through sequential polymerization of propylene and its mixture with one of ethylene, alpha-olefins, and ethylene and alpha-olefins; and blends of propylene copolymers with EP(D)M.

2. A process according to claim 1 wherein said EPM and EPDM polymers are extended with an additional amount of oil within the range from 1 to 60% by weight of the amount of EP(D)M polymers.

3. A process according to claim 1, wherein the vinylpolybutadiene grafting units are within a range from 0.1 to 5.0% by weight of the total weight of the composition and the polyalkenylenes are within a range from 1.5 to 20% by weight of the total composition.

4. A process according to claim 1, to wherein said polyalkenylenes are polyocteneylenes.

5. The process of claim 1, wherein the ethylene content of said EPM and EPDM polymers is less than 60%.

6. A method as in claim 1, wherein the heating the mixed units includes extruding the mixed units under heat.

* * * * *